3,340,011
HYDROGEN PRODUCTION
James Hoekstra, Evergreen Park, and Vladimir Haensel, Hinsdale, Ill., assignors to Universal Oil Products Company, Des Plaines, Ill., a corporation of Delaware
No Drawing. Filed Dec. 16, 1963, Ser. No. 330,662
4 Claims. (Cl. 23—212)

ABSTRACT OF THE DISCLOSURE

Production of hydrogen by decomposition of hydrocarbons in contact with a Group VIII metal catalyst supported on alumina containing calcium, strontium or barium to improve hardness and attrition resistance of the catalyst.

---

This invention relates to improved means for effecting hydrogen production and in particular to the use of an improved catalyst composite adapted to effect the decomposition of a hydrocarbon stream to produce high yields of hydrogen.

Hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen has been effected in the presence of supported platinum group and iron group metals. It is generally considered that higher conversions are most readily attained through the combined effect of an acid-acting cracking catalyst, such as silica-alumina, as a supporting material. However, it has now been determined that a catalyst consisting of alumina, which is comparatively neutral, and a metal of Group VIII or more particularly nickel of the iron group of metals, exhibits considerably greater activity with respect to the decomposition of normally gaseous hydrocarbons to hydrogen than does a catalyst consisting of silica-alumina and nickel. In other words, the comparatively neutral alumina unexpectedly imparts a higher degree of activity to the catalyst than does the acid-acting high silica content-alumina catalyst, and this is so despite the recognized superiority of silica-aluminas as gas oil cracking catalysts.

In carrying out a continuous hydrogen producing operation on a commercial scale it is advantageous to utilize a fluidized or moving bed system to effect an efficient catalytic contact with the hydrocarbon stream. It is also of advantage to provide for the continuous fluidized transporting of the catalyst particles from the reaction zone to the regeneration zone, or carbon removal zone, and from the latter back to a reaction zone; however, it has been found that the all alumina base decomposition catalysts are more susceptible to rapid attrition in a fluidized bed type of conversion system and that the catalyst loss may be too high for a successful commercial use. As a result substantial experimental work and research steps have been undertaken to improve the strength or attrition resistance characteristics of a decomposition catalyst composite utilizing a porous base or carrier material which is substantially all alumina.

It is an object of the present invention to provide an improved hydrogen producing operation utilizing a novel improved catalyst composite for the decomposition of a hydrocarbon stream which incorporates with an alumina or predominantly alumina base a small quantity of an alkaline earth component selected from the group consisting of calcium, strontium and barium.

Thus, broadly the present invention embodies a process for producing hydrogen which comprises contacting a normally gaseous hydrocarbon stream at decomposition conditions with a catalyst composite consisting primarily of alumina as a carrier material, an alkaline earth component selected from the group consisting of calcium, strontium and barium and a catalytically active metal component selected from Group VIII of the Periodic Table.

In a more specific embodiment, the invention embodies a fluidized method for effecting the decomposition of a hydrocarbon stream to produce hydrogen and carbon which comprises, contacting said stream at decomposition conditions with a catalytic composite consisting predominantly of anhydrous alumina as a carrier material, an alkaline earth component selected from the group consisting of calcium, strontium and barium in an amount greater than 1 percent by weight of the resulting composite and a metal of the iron group of the Group VIII metals of the Periodic Table, with said metal comprising from about 3% to about 30% by weight of the aforesaid catalytic composite.

Of the iron group metals nickel is generally preferable, although in many instances iron appears to provide a satisfactory active catalyst when used as the active metal component. Also, of the selected alkaline earth group components it has been found that barium is generally preferable to calcium or strontium when composited with alumina to provide an improved strength catalyst base.

In accordance with the process of this invention, a normally gaseous hydrocarbon stream is heated and decomposed in contact with a catalytic composite consisting primarily of anhydrous alumina, a metal of Group VIII of the Periodic Table and an alkaline earth component selected from the group consisting of calcium, strontium and barium. A normally gaseous hydrocarbon stream relates to so-called natural gas or refinery "off-gas" comprising principally methane, but also including minor quantities of ethane, ethylene, propane, propylene, butane, isobutane, butylene, isobutylene, etc. While optimum conversion to hydrogen results from the treatment of a normally gaseous hydrocarbon in accordance with the present invention, like treatment of heavier hydrocarbons will also result in the conversion thereof to hydrogen although not necessarily to the same or an equivalent extent.

The conversion of normally gaseous hydrocarbons in the manner herein contemplated, is effected in contact with a catalytic composite consisting primarily of anhydrous alumina, an alkaline earth component selected from the group consisting of barium, calcium and strontium, and a metal of the iron group of metal of the Periodic Table. It is understood that although the alumina may serve incidentally as a catalyst support, its primary value lies in its contribution to the overall activity of the catalyst composite of this invention with respect to the decomposition of normally gaseous hydrocarbons to hydrogen. The activity of the catalyst composite may in part result from an independent effect exerted by the alumina, or more preferably the activity may result by reason of a peculiar association of the alumina with the activating metal to give a catalytic composite of improved catalytic characteristics.

The alumina may be synthetically prepared or a naturally occurring alumina such as is recovered from bauxite. Synthetically prepared aluminas predominate in the industry for a catalyst base and are of the gel type generally prepared by precipitation methods. For example, an alkaline reagent such as ammonium hydroxide, ammonium carbonate, etc., is commingled with an acidic solution of an aluminum salt, which may be an aqueous solution of aluminum chloride, aluminum sulfate, aluminum nitrate, and the like to precipitate the desired alumina. Alternatively, alumina may be precipitated by commingling hydrochloric acid, sulfuric acid, nitric acid, or the like, with an alkaline solution of a suitable aluminum salt such as sodium aluminate, potassium aluminate, etc.

In either case the alumina is generally water washed and dried at a temperature of from about 200° F. to about 400° F. The dried alumina may be subsequently formed into desired microspheres or subdivided particles by spray drying or spinning disc means or it may be utilized in the form of a powder or granules of different size and shape.

Regardless of the source or method of preparation, the dried alumina, prior to impregnation, is subjected to calcination at a temperature of at least 900° F., and generally at a temperature of from about 900° F. to about 1500° F. to yield a substantially anhydrous alumina. A particularly preferred calcination temperature is from about 1000° F. to about 1400° F. The calcination may be effected in any suitable atmosphere. Usually the calcination is effected in the presence of air or other oxidizing media although in some cases it may be effected in a reducing atmosphere such as hydrogen, or an inert atmosphere such as nitrogen. The time of calcination will vary with the temperature of calcination. Generally, the time of calcination will be from about one-half hour to about 10 hours.

As noted hereinbefore and by reason of improved conversion results, the all-alumina base is generally preferred to the silica-alumina base for methane decomposition; however, the improved alumina carrier with the barium, calcium or strontium component may incorporate at least one other refractory inorganic oxide in conjunction with the alumina. Specifically, an oxide such as silica, titania, zirconia, hafnia or a mixture of two or more of such oxides may be incorporated with the alumina. The addition or incorporation of any of these refractory inorganic oxides, with the alumina is generally dependent upon the desire to add thereto certain physical and/or chemical characteristics. The added oxide or oxides may be present within the carrier material in an amount within the range of about 0.5% to about 50.0% by weight thereof. Intermediate quantities are preferred, and will be normally within the range of about 1.0% to about 10.0% by weight. The additional oxide or oxides may be effectively incorporated with the alumina by adding a water soluble salt of the component into the solution from which the alumina is precipitated. Silica-alumina bases are, as noted hereinbefore, in common use in the preparation of catalysts and in the present instance silica is a preferred additive to provide a desired composite for a decomposition catalyst since the silica appears to also add attrition resistance to the resulting finished catalyst composite.

The catalytic composite of this invention consists of the above described substantially anhydrous alumina and a metal of Group VIII of the Periodic Table as presented on pp. 400–401 of the 39th Edition (1957–58) of the "Handbook of Chemistry and Physics." Of the Group VIII metals, the iron group metals, iron, nickel and cobalt are preferred, and in particular nickel is the most satisfactory. The metals can be composited with the alumina in any suitable manner. For example, the alumina can be soaked, dipped, suspended or otherwise immersed in a solution of a suitable compound of the selected metal. Suitable compounds include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric chloride, ferric bromide, ferric fluoride, ferric nitrate, ferric sulfate, ferric formate, ferric acetate, etc.

The catalytic composite is dried at a temperature of from about 200° F. to about 400° F. prior to final calcination. The dried catalytic composite is calcined at a temperature of at least 800° F., generally in the range of about 800° F. to about 1500° F., and preferably at a temperature of from about 1100° F. to about 1400° F. The final calcination may also be effected in any suitable atmosphere. Usually calcination is in the presence of air or other oxidizing atmosphere although, in some cases, it may be effected in the presence of steam or in a reducing atmosphere such as hydrogen, or an inert atmosphere such as nitrogen. The final calcination of the catalytic composite serves to activate the catalyst and fix the catalytic components thereof. As previously indicated, although the alumina may serve incidentally as a catalyst support, its primary value lies in its contribution to the over-all activity of the catalytic composite.

Various methods of impregnation may be used to impregnate the carrier material with the added alkaline earth components. Generally, a water soluble compound of the particular component is used to soak the carrier or the activated composite so as to insure a bond of the component, as a resulting oxide with the carrier. Thus, the barium, strontium or calcium compound may be in the form of a hydroxide, a formate, nitrate, etc., when used to impregnate the carrier or composite. Impregnation may be adequately accomplished in a one or two hour soaking, however, generally the soaking will be carried out for 4 to 20 hours, or the like, to provide optimum results. After the impregnation the composite is subjected to drying by heating or the use of a rotary evaporator. It appears also that impregnation with the added component may be before or after impregnation with the active metallic catalytic component although the activity stabilities, hardness and/or attrition resistance may not be the same from the different methods of compositing.

In any case, a final catalytic composite provided wherein the alkaline earth component comprises at least 2 weight percent thereof and the activating metal comprises from about 3 weight percent to about 20 weight percent thereof, computed as the elemental metal, unless a noble metal is utilized in which case the component will generally comprise less than about 0.1 percent thereof.

One preferred embodiment of this invention relates to decomposing a normally gaseous hydrocarbon stream at decomposing conditions in the presence of a catalytic composite consisting primarily of anhydrous alumina, from about 3 weight percent to about 20 weight percent nickel and barium oxide in an amount greater than about 2 percent by weight of the composite.

Another preferred embodiment concerns the decomposition of a normally gaseous hydrocarbon stream at decomposition conditions in the presence of a catalytic composite consisting primarily of anhydrous alumina, from about 3 weight percent to about 15 weight percent iron and barium oxide in an amount greater than about 2 percent by weight of the composite.

The conversion of normally gaseous hydrocrbons is effected in accordance with the present process by contacting said hydrocarbons with the above-described catalyst composite at decomposition reaction temperature from about 1300° F. to about 1800° F. or more. Pressure is not an important variable with respect to the decomposition of normally gaseous hydrocarbons as herein contemplated except that superatmospheric pressure may be utilized to effect a process flow.

The present process may be effected in any conventional or otherwise convenient manner. One method comprises locating the catalytic composite in a fluidized-fixed bed within a reactor. The hydrocarbon charge is passed therethrough at the desired decomposition reaction temperature in upward flow, and the reactor effluent is withdrawn from the reactor at a rate which will insure an adequate residence time therein. In this type of operation, the hydrocarbon charge is periodically alternated with a flow of air or other oxygen-containing gas to effect a controlled burning of the carbon deposits from the catalytic composite.

Another method of effecting the process of this invention, as set forth briefly hereinbefore, utilizes a separate reactor and regenerator, whereby the catalytic composite is continuously passed through the reactor either concurrently or countercurrently to the hydrocarbon charge, whereby to effect an efficient contacting between the catalyst and the gas stream. The catalytic composite is thereafter circulated through the regenerator either concurrently or countercurrently to a stream of air, or other oxygen-containing gas, whereby the carbon is burned from the catalyst and the resulting hot regenerated catalyst is subsequently circulated to the reactor in contact with further quantities of the hydrocarbon charge to complete the cycle.

The catalyst particles for the fluidized operations are preferably in the form of small microspheres such that they are readily fluidized and transported and are generally less than about 1 mm. in diameter, with the major portion thereof in the 10 to 200 micron range.

The following examples are presented to illustrate the improved hardness and attrition resistance of a catalyst composite utilizing certain alkaline earth components for use in effecting hydrogen production; however, such examples are for the purpose of illustrating only the improved physical characteristics of the composite and are not intended as a limitation in any manner on the generally broad scope thereof.

In order to determine the hardness of the particles and their resistance to attrition when used under fluidized operation conditions, a portion of the particles were subjected to a standard 42 hour attrition test. The apparatus for the attrition test embodies an approximately 27" long by 1½" I.D. lower tube with a perforate disc at the bottom, an enlarged upper 22" long by 5" I.D. chamber, and an overhead fines collecting flask. An air jet stream, with a velocity of about 890 feet per second passes up through a 45 gram catalyst sample in the lower tube and effects fluidization and attrition of the catalyst particles as they collide with each other. The weight percent recovery of fines collected in the overhead flask at the end of 12 hours of operation is determined as one measures for comparison purposes. Also, the average hourly rate of fines production of the next 30 hours (from 12 to 42 hours) is calculated to provide another evaluation guide.

*Example I*

Microspheres of 96% alumina and 4% silica were prepared by spraying an alumina-silica sol containing a small quantity of HMT (hexamethylenetetramine) into hot (200° F.) white forming oil, with HMT being used in an amount such that the resulting microspheres from the solid droplets would set. The particles were then aged further for 3 hours in oil and 1 hour in ammonia at a temperature of about 200° F. The aged spheres were then washed, dried and calcined at about 1500° F. Following calcination the particles were impregnated in a nickel nitrate solution and steam dried in a rotating evaporator unit, with the nickel being added in an amount to provide approximately 10% nickel, by weight of the finished and calcined catalyst. The calcination after impregnation was also carried out at approximately 1500° F.

Following the use of the catalyst particles in a laboratory test unit for the conversion of methane to hydrogen and carbon, a portion thereof was subjected to attrition testing in the manner described hereinbefore. The test results showed a particle loss of 6.6% at the end of the first 12 hours of testing and an average rate of fines production equivalent to 0.34% at the end of the 12 to 42 hour period.

*Example II*

In this example microspherical particles of 96% alumina and 4% silica were prepared in a manner similar to that set forth in Example I and likewise treated with a nickel nitrate solution to provide an approximate 10% nickel by weight of the finished composite, except, however, prior to the nickel impregnation, the alumina-silica base material was impregnated with a barium hydroxide solution in an amount to provide approximately 10% barium oxide by weight of the base material.

Following the use of the catalyst particles in a laboratory test unit for the conversion of methane to hydrogen and carbon, a portion thereof was subjected to attrition testing in accordance with the previously described standard testing procedure, with the results showing a particle loss of 6.2% at the end of the first 12 hour period of testing and an average rate of fines production equivalent to 0.03% at the end of the 12 to 42 hour period.

*Example III*

In this example microspherical particles of 96% alumina and 4% silica were prepared in a manner similar to that set forth in Example I and likewise treated with a nickel nitrate solution to provide an approximate 10% nickel by weight of the finished composite.

Following the use of the catalyst particles in a laboratory test unit for the conversion of methane to hydrogen and carbon, a portion thereof was subjected to attrition testing in accordance with the previously described standard testing procedure, with the results showing a particle loss of 4.9% at the end of the first 12 hour period of testing and an average rate of fines production equivalent to 0.24% at the end of the 12 to 42 hour period.

*Example IV*

In this example microspherical particles of 96% alumina and 4% silica were prepared in a manner similar to that set forth in Example I and likewise treated with a nickel nitrate solution to provide an approximate 10% nickel by weight of the finished composite, except, however, in this catalyst sample the alumina-silica carrier base was impregnated with a strontium hydroxide solution, prior to the nickel impregnation, to provide a resulting dried and calcined carrier having approximately 5% strontium oxide by weight thereof.

Following the use of the catalyst particles in a laboratory test unit for the conversion of methane to hydrogen and carbon, a portion thereof was subjected to attrition testing in accordance with the previously described standard testing procedure, with the results showing a particle loss of 3.5% at the end of the first 12 hour period of testing and an average rate of fines production equivalent to 0.05% at the end of the 12 to 42 hour period.

In comparing the results in Examples I and II, as well as those of the Examples III and IV, it will be noted that a barium oxide addition resulted in providing a significantly greater attrition resistance as compared to the catalyst composite having no additive, while similarly, the catalyst having the strontium oxide additive has significantly more attrition resistance than the comparison run with no alkaline earth additive.

We claim as our invention:

1. A method for effecting the decomposition of a hydrocarbon stream to produce hydrogen which comprises, contacting said stream at a decomposition temperature of at least 1300° F., with a catalytic composite consisting primarily of anhydrous alumina as a carrier material, an alkaline earth component selected from the group consisting of calcium, strontium and barium to improve hardness and attrition resistance, and an active metal of Group VIII of the Periodic Table, and recovering the resultant hydrogen.

2. A method for effecting the decomposition of a hydrocarbon stream to produce hydrogen which comprises, contacting said stream at a decomposition temperature of at least 1300° F., with a catalytic composite consisting primarily of anhydrous alumina as a carrier material, an alkaline earth component selected from the group consisting of calcium strontium and barium in an amount greater than about 2% by weight of the resulting composite to improve hardness and attrition resistance and a metal of the iron group of Group VIII metals of the Periodic Table, and recovering the resultant hydrogen.

3. The method of claim 2 further characterized in that said metal of the iron group comprises nickel.

4. A method for effecting the decomposition of a normally gaseous hydrocarbon stream which comprises, contacting said stream at a decomposition temperature above about 1300° F. with a subdivided catalyst of improved hardness and attrition resistance prepared by impregnating alumina particles with an alkaline earth component selected from the group consisting of calcium, strontium and barium in an amount greater than about 2% by weight of the resulting composite and with nickel in an amount greater than about 5% by weight of the composite, and recovering the resultant hydrogen.

References Cited

UNITED STATES PATENTS

| | | | |
|---|---|---|---|
| 2,229,199 | 1/1941 | Voorhies | 23—212 X |
| 3,129,060 | 4/1964 | Pohlenz | 23—212 |
| 3,256,207 | 6/1966 | Arnold | 23—212 X |
| 3,278,268 | 10/1966 | Pfefferle | 23—212 |

OSCAR R. VERTIZ, *Primary Examiner.*

EDWARD STERN, *Examiner.*